April 13, 1948.  C. G. ROPER  2,439,673
AIR VOLUME CONTROLLER
Filed June 12, 1944   2 Sheets-Sheet 1
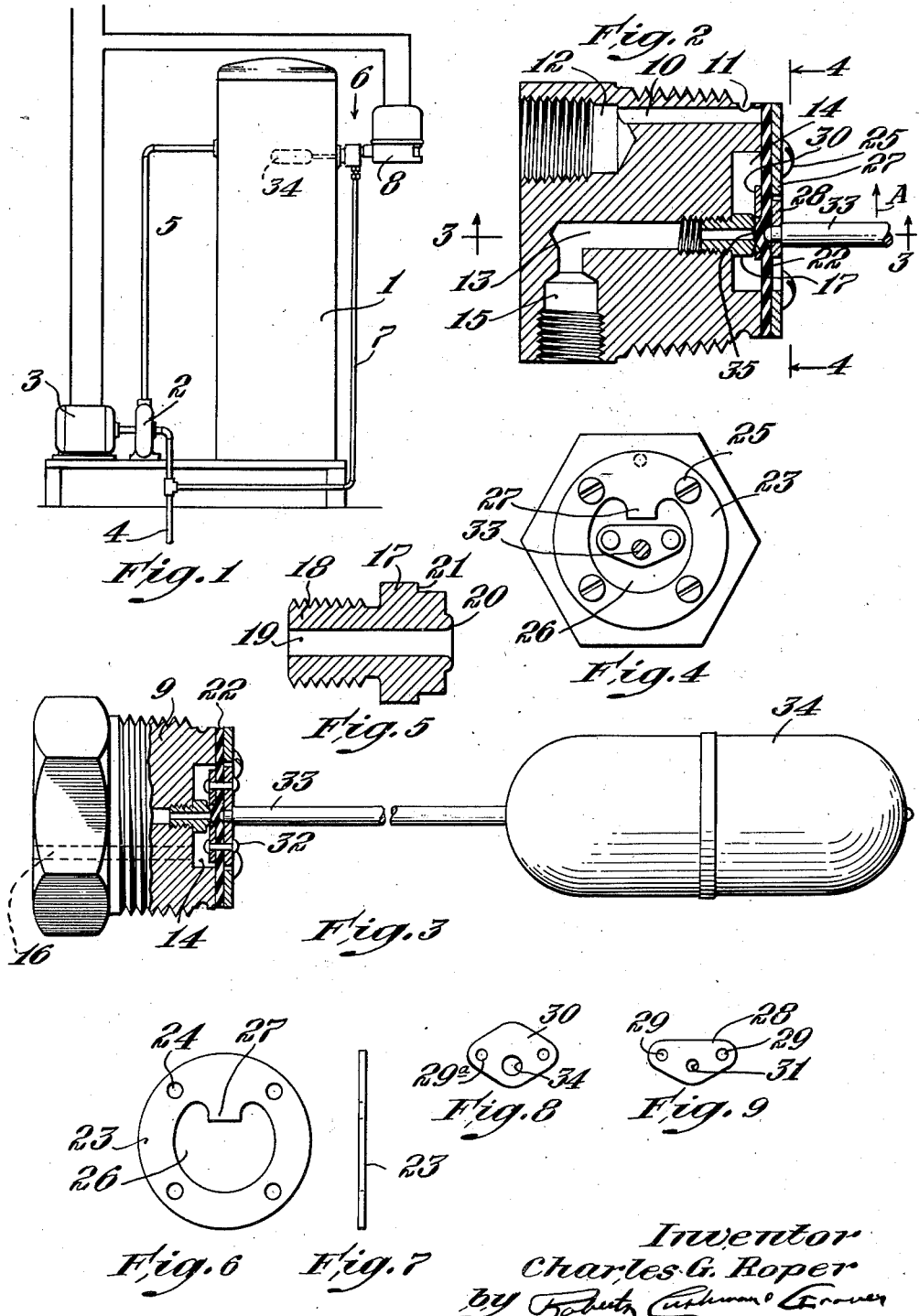
Inventor
Charles G. Roper
By Roberts Cushman & Grover
att'ys.

April 13, 1948.  C. G. ROPER  2,439,673
AIR VOLUME CONTROLLER
Filed June 12, 1944   2 Sheets-Sheet 2

Inventor
Charles G. Roper
by Roberts Cushman & Crowe
Att'ys.

Patented Apr. 13, 1948

2,439,673

UNITED STATES PATENT OFFICE 2,439,673

AIR VOLUME CONTROLLER

Charles G. Roper, Fairfield, Conn., assignor to Manning, Maxwell & Moore, Incorporated, New York, N. Y., a corporation of New Jersey Application June 12, 1944, Serial No. 539,836

10 Claims. (Cl. 137—68)

This invention pertains to air volume controllers for liquid storage tanks, and more especially to an improved valve constituting part of such a controller and to improved means for supporting the valve.

Customarily such a controller comprises an element, for example a float within the tank, which moves in response to variations in liquid level, an air control valve located outside of the tank, and means for transmitting motion (without permitting leakage) from the float within the tank to the valve outside of the tank. Previous devices of this type have customarily been of somewhat complicated type, including a number of relatively movable accurately finished parts; they have been expensive to make and often require frequent servicing to keep them in proper operative condition; and sometimes require substantial modification of the tank and connecting pipe to admit of their installation.

The present invention has for objects the provision of a simple, rugged and inexpensive controller which does not necessarily include relatively rotating or sliding metallic parts or complicated linkages; to provide a controller having a minimum number of parts and which has a minimum number of points where friction occurs thus making it easy of operation and but little subject to wear; to provide a controller which is substantially silent in operation; to provide a controller wherein the functions of the valve head, gland packing and pivotal support for the operating arm are all embodied in a single element, to wit, a flexible diaphragm or the like; to provide a controller whose parts are not seriously affected by corrosion and in which the valve operating diaphragm is substantially unaffected by variation in pressure at its opposite sides; to provide a controller which may readily be disassembled for cleaning or inspection; and to provide a controller wherein the movement of the valve head toward and from the seat is effected by flexing a diaphragm. Other and further objects and advantages of the invention will be pointed out hereinafter in the following detailed description and by reference to the accompanying drawings wherein Fig. 1 is a diagrammatic elevation of a liquid storage tank provided with a power driven pump, and with an air volume controller embodying the present invention;

Fig. 2 is a diametrical sectional view, to large scale, showing a valve housing, in the form of a plug, embodying the present invention;

Fig. 3 is a fragmentary section to somewhat smaller scale substantially on the line 3—3 of Fig. 2 showing the valve actuating float in plan;

Fig. 4 is a section on the line 4—4 of Fig. 2;

Fig. 5 is a diametrical section of a seat-forming plug forming part of the device shown in Figs. 2 and 3;

Fig. 6 is a front elevation and Fig. 7 is an edge elevation of the diaphragm clamping plate of the arrangement of Figs. 2 and 3;

Fig. 8 is a front elevation of the rear diaphragm-stiffening plate;

Fig. 9 is an elevation of the front diaphragm-stiffening plate;

Figure 10:
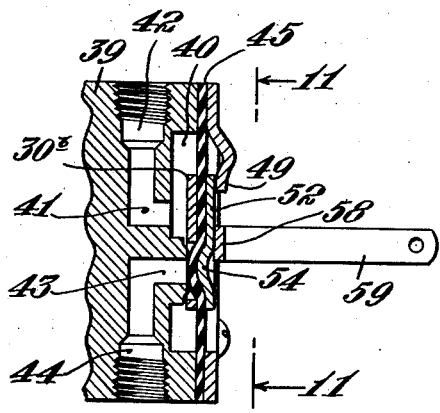
Fig. 10 is a view generally similar to Fig. 2 but illustrating a modification, the valve being seated.

Referring to the drawings, the numeral 1 designates the tank, for example of a water supply system, the tank being supplied with water under pressure by a suitable pump 2 driven by the motor 3. The pump draws water from a well or other source of supply through the pipe 4 and delivers it to the tank through pipe 5. The tank is provided with an internally screw-threaded opening in its wall, near the top of the tank, for mounting the air control device 6 constituting the immediate subject matter of the present invention. From this air control a pipe 7 leads to the intake 4 of the pump so as, at times, to permit the pump to draw in air and to deliver the air together with the water through the pipe 5 into the tank. Preferably there is associated with the air control device 6 a pressure switch 8 which determines the times of operation of the motor 3.

The improved air control devices of the present invention preferably comprises a housing 9 (Fig. 3) formed as an externally screw-threaded plug designed to be screwed into the aforesaid opening in the tank wall. When the pressure control switch is to be directly associated with the air intake device, the plug or housing 9 is furnished with a passage 10 (Fig. 2), open at its inner end at 11 for communication with the interior of the tank when the plug is in place, and opening at its outer end into an externally screw-threaded bore 12 in the outer end of the plug, the bore 12 being designed to receive a threaded nipple projecting from and operative to support the switch device.

The plug or housing 9 is also furnished with a passage 13 here shown as parallel with the passage 10 and which at its inner end communicates with a recess 14 at the inner end of the plug, the inner end of the plug being a finished plane surface. The passage 13 communicates at its opposite end with a bore 15, here shown as radial, which is internally screw threaded for the reception of the end of the pipe 7.

Another passage 16 (Fig. 3) extends from the outer end of the plug into the recess 14 and provides free communication between the recess and the outer atmosphere.

In accordance with a preferred construction, the inner end of the passage 13 is screw threaded and is designed to receive a valve seat device 17 (Fig. 5) having an externally screw-threaded tail portion 18 which engages the threads in the passage 13. This seat device 17 has an axial bore 19 providing communication between the passage 13 and the recess 14, the bore 19 terminating at an annular valve seat surface 20 formed on the inner end of the member 17. Preferably the part 17 has an annular shoulder 21 coaxial with the annular seat surface 20 and spaced a short distance rearwardly from the latter.

The inner end of the recess 14, that is to say that side of the recess which is directed to the interior of the tank, is provided with a flexible wall constituted by a diaphragm 22 of suitable flexible material, for example, rubber or rubberized fabric. This diaphragm is held in place against the finished end surface of the plug 9 by a clamping ring 23 (Figs. 6 and 7) having openings 24 for the reception of screws 25 which enter threaded openings in the inner end of the plug 9, and by means of which the plate 23 may be pressed so firmly against the marginal portion of the diaphragm as to make the latter leak-tight. The location of the diaphragm is such that its plane is parallel to the plane of the valve seat surface 20 and very close to the latter, in fact it is desirable to locate the parts so that the inner plane surface of the diaphragm would normally contact the seat surface 20 with more or less pressure. As shown in Fig. 6, the clamping plate 23 has a central aperture 26, and preferably a rigid tongue or tab 27 projects inwardly into this recess at one side.

At that side of the diaphragm 22 which is exposed to the interior of the tank, a stiffening plate 28 is arranged. This plate (Fig. 9) is desirably of somewhat triangular shape, having openings 29 near its opposite ends for the reception of rivets 32 or the like, and having an opening 31 at its lower part for the reception of the threaded end of the float stem 33. The stem 33 is rigidly united to plate 28, for example by silver brazing, screw threads or the like. This float stem is a rigid rod of suitable length, and is fixed at its opposite end to a float 34. This float is of a diameter slightly less than the maximum diameter of the plug 9 so that the float may be introduced into the tank by passing it endwise through the opening provided for the reception of the plug 9.

At the opposite side of the diaphragm a second stiffener plate 30 is arranged, this plate also having openings 29ª which are registered with the openings 29 of the plate 28, the rivets 32 passing through the registered openings in the plates 28 and 30, and through the diaphragm and firmly clamping the central portion of the diaphragm between the stiffener plates. The plate 30 is provided with an opening 34, and in riveting the stiffener elements 28 and 30 together, the pressure exerted upon the flexible elastic material of the diaphragm is such as to cause the diaphragm material to protrude into and through the opening 34 to form a convexly curved boss 35 which constitutes the valve head. The parts are so arranged that the convex inner surface of this head 35 is disposed directly opposite the passage 19 in the seat member 17, the boss or head 35 engaging the seat surface 20. Since the valve-forming portion of the diaphragm is rigidly clamped between plates 30 and 28, and the latter is rigidly united to the end of float stem 33, the weight of the float, acting through the long leverage afforded by the stem, tends to tilt or rock the parts 28, 35 and 30 about the end of tab 27, as a fulcrum, thereby aiding the elastic tension of the diaphragm in holding the valve element 35 against the seat, so that the valve head 35 normally bears with substantial pressure against the valve seat sufficient to prevent leakage between the chamber 14 and the passage 19.

Assuming that the device has been arranged as shown in Fig. 1, and assuming that the liquid level in the tank rises so that the float moves upwardly, such movement will tilt the stem 33 of the float upwardly. Thus, since the central portion of the diaphragm is rigidly clamped between the plates 28 and 30 and rigidly united to the stem, the upward movement of the float will flex the diaphragm along lines approximatinug parallel chords spaced at opposite sides of its axis thus tilting the valve head 35 away from the valve seat surface, that portion of the diaphragm which is clamped between the plates being thus inclined to the plane of the marginal portion of the diaphragm. The tilting of the valve head away from the valve seat surface provides communication between the chamber 14 and the pipe 7. Assuming that the pump is operating, air will now be drawn in through the passage 16 into the chamber 14 and thence will pass through the valve seat orifice and passage 19 into the passage 13, and thence through the pipe 7 into the suction side of the pump so that air will be delivered into the upper part of the tank, thereby increasing the pressure until the switch 8 is caused to operate, thus stopping the motor 3.

With the arrangement above described it is unnecessary to provide trunnions or other metallic bearings for the float stem or to provide an accurately finished valve head and valve seat surface, or to provide a packing gland or other equivalent arrangement, since the diaphragm not only effectively closes communication between the chamber 14 and the interior of the tank, but it also provides a flexible supporting hinge for the float stem, and at the same time itself constitutes the valve head for direct cooperation with the valve seat. Since the diaphragm itself is of elastic, flexible material, it forms an effective leak-tight contact with the seat without necessitating accurate machining of the seat or of the valve head. The number of parts is thus reduced to a minimum, but without sacrifice of accuracy of operation.

The opening 34 in the inner stiffener plate 30 is of a diameter somewhat less than the diameter of the shoulder 21, so that the central part of the diaphragm is effectively supported against pressure acting on the exposed or tank side of the diaphragm by engagement of the stiffener plate 30 with the shoulder 21.

Figure 14:
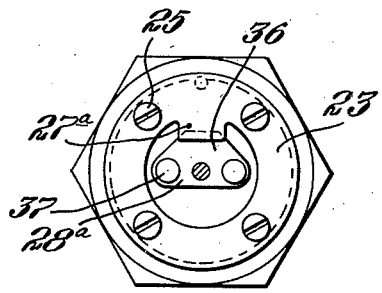
Fig. 14 is a section on the line 14—14 of Fig. 13.
Figure 13:
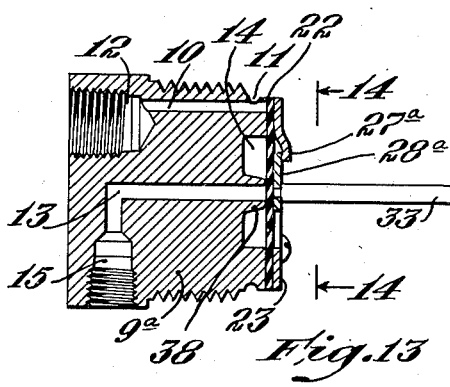
Fig. 13 is a view generally similar to Fig. 2 but illustrating a further modification.

In Figs. 13 and 14 an even simpler construction is illustrated, similar parts being designated by the same reference characters as those above employed. In this instance, the plug $9^a$ is provided at the inner end of the passage 13 with an integral boss 38, whose end is finished to form the annular valve seat surface. In this arrangement the inner stiffener plate at the recess side of the diaphragm is omitted, the stiffener plate $28^a$ being secured directly to the diaphragm by the rivets 37 (Fig. 14). With this arrangement the diaphragm is not bulged rearwardly to form the valve head, but the central portion of the flat diaphragm itself engages the valve seat surface of the boss 38 to constitute the valve head. As illustrated, the clamping plate 23 has the inwardly directed lug or ear $27^a$ which in this instance is deflected toward the interior of the tank so as to overlie the upper part of the stiffening plate $28^a$ under normal conditions. With this arrangement, unbalanced pressure at the tank side of the diaphragm is supported by direct contact of the diaphragm with the valve seat surface, while unbalanced pressure in the chamber 14 is supported by engagement of the plate $28^a$ with the ear or lug $27^a$. The operation of this modified construction is the same as that above described.

Figure 11:
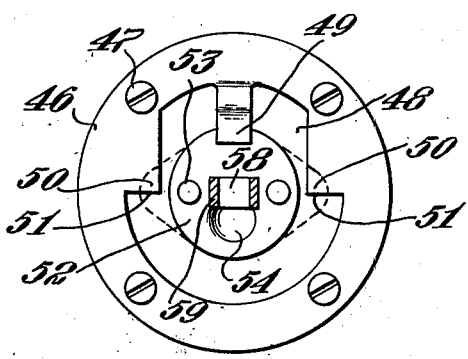
Fig. 11 is a section on the line 11—11 of Fig. 10.
Figure 12:
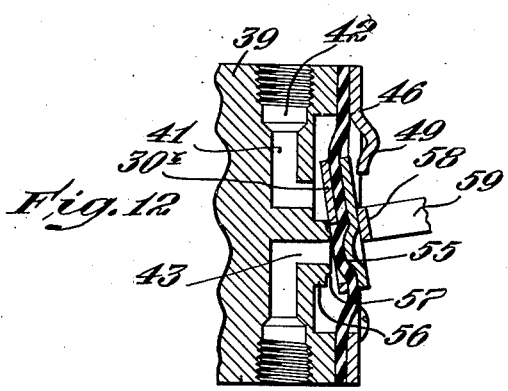
Fig. 12 is a view similar to Fig. 10 but showing the valve open.

A further modification is illustrated in Figs. 10, 11 and 12. This arrangement, while useful in the same way as that above described for controlling the inlet of air to a water supply tank, may be of more general utility. In this modification the valve comprises a support or housing 39 (which may be of any suitable construction and external configuration dependent upon the particular use to which the valve device is to be applied). As here illustrated, this housing or support 39 is a unitary mass of material having a plane right-hand outer surface (as viewed in Figs. 10 and 12) with a recess 40 formed in the substance of the housing or support and initially open at this plane surface of the support. A passage 41 leads from the recess 40 to an internally screw-threaded bore 42 designed to receive the end of a pipe. A second passage 43 also leads from the recess 40, terminating in an internally screw-threaded bore 44 also designed to receive a pipe. The recess 40 is closed at its outer side by the flexible wall or diaphragm 45 which is clamped against the plane surface of the housing or support 39 by a clamping plate 46 having openings for the reception of screws 47. As described with reference to the preceding arrangements, the normal plane of the diaphrgm is parallel to that of the valve seat, and preferably so located that the inner surface of the diaphragm normally bears with considerable elastic pressure against the valve seat. The clamping ring 46 has a central aperture 48, here shown as of a generally inverted T-shape having a lug 49 directed downwardly and inwardly from its upper margin. The shape of the opening provides shoulders 50 disposed at opposite sides of the vertical diameter of the ring, said shoulders having edges 51 which are aligned with each other and which are substantially diametrical with respect to the circumference of the plate 46.

A stiffening plate 52 is located within the aperture 48 and bears against the exposed outer face of the diaphragm 45. A second stiffener plate $30^b$ is arranged at the inner side of the diaphragm, and these plates are firmly united by rivets 53 (Fig. 11). Preferably the outer plate 52 is provided with a dimple-like depression 54 (Fig. 11) which forms a curved boss at the opposite side of the plate. This boss forces the diaphragm rearwardly into the opening in the plate $30^b$ so as to form the seat-engaging element or valve head 55. The housing or support 39 is so formed as to provide an annular integral boss 56 projecting into the chamber 40 and coaxial with the passage 43, the right-hand end surface of this boss 56 being finished to form an annular valve seat, the boss also preferably being shaped to provide the annular shoulder 57 coaxial with the valve seat.

A bracket member 58 is riveted, spot-welded or otherwise rigidly secured to the central part of the outer stiffener plate 52, and as here shown is provided with a pair of parallel arms 59 by means of which the diaphragm may be flexed transversely along lines approximating chords of the diaphragm so as to unseat the valve head 55 and thus provide communication through the chamber 40 between the passages 41 and 43. In this arrangement the central part of the unflexed diaphragm is supported against unbalanced pressure by the annular shoulder 57. The shoulders 50 with their aligned radial edges 51 constitute fulcrum means defining a definite axis about which the diaphragm is flexed when force is applied to the arms 59. However, as in the arrangements above described, the number of moving parts is reduced to a minimum and there is no necessity for careful machining or the use of packing glands or the like, and the valve head is of such character as to make a good leak-tight contact with the seat surface, the elasticity and tension of the diaphragm producing all the necessary pressure to hold the valve seated.

Figure 15:
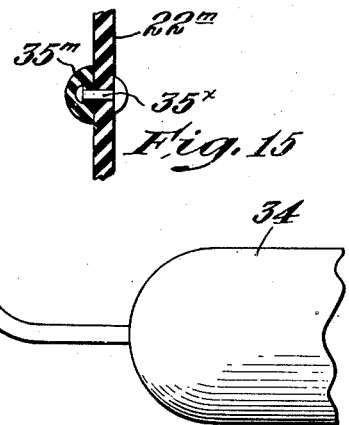
Fig. 15 is a fragmentary diametrical section through the diaphragm element of the device, illustrating a modified form of valve head.

In Fig. 15 a further slight modification is suggested wherein the diaphragm $22^m$ is furnished, at its seat-engaging side, with a valve head member $35^m$ riveted to the diaphragm at $35^x$, the head $35^m$ being of any suitable material which may be like or different from that of the diaphragm. Such an arrangement provides the possibility of renewal of the valve head itself without renewing the entire diaphragm, and also permits the use of a material somewhat harder or more wear-resistant than that of the diaphragm to constitute the valve head if that appears to be desirable.

While certain embodiments of the invention have been illustrated and described, it is to be understood that these are merely by way of illustration and that the invention is broadly inclusive of any and all equivalent constructions falling within the terms of the appended claims.

I claim:

1. A valve device comprising a part having therein a fluid flow passage terminating in an annular valve seat, a flexible, elastic diaphragm normally disposed in a plane substantially perpendicular to the axis of the valve seat, a portion of the diaphragm protruding from its general plane to constitute a valve head, said valve head being normally held in fluid-tight engagement with the seat by the elastic tension of the diaphragm, and means operative to flex the diaphragm transversely about a line approximating a chord of the diaphragm spaced from its axis thereby to rock the valve head away from the seat.

2. A valve device comprising a part having therein a passage which terminates in an annular valve seat, a valve head cooperable with the seat to control fluid through the passage, the valve head being carried by a flexible, elastic diaphragm normally disposed in a plane substantially perpendicular to the axis of the valve seat and so close to the plane of the valve seat as normally to hold the valve head in fluid-tight contact with the valve seat, and means for flexing the diaphragm transversely of its axis thereby to separate the valve head from the seat, the seat being so shaped as to provide an abutment for the diaphragm thereby to support the latter against unbalanced fluid pressure acting in a direction toward the seat.

3. A valve device comprising a part having therein a passage which terminates in an annular valve seat, a valve head cooperable with the seat to control fluid flow through the passage, the valve head being carried by a flexible, elastic diaphragm normally disposed in a plane substantially perpendicular to the axis of the valve seat and so close to the plane of the valve seat as normally to hold the valve head in fluid-tight contact with the valve seat, means for flexing the diaphragm transversely of its axis thereby to separate the valve head from the seat, and means operative to support the diaphragm against unbalanced pressure acting perpendicularly thereto and in a direction away from the valve seat.

4. A valve device comprising a part having therein a passage which terminates in an annular valve seat, a flexible, elastic diaphragm disposed in a plane parallel to the plane of the valve seat and so located that its central portion registers with the valve seat, rigid stiffening elements disposed at opposite sides of the central part of the diaphragm, said stiffening elements being so constructed and arranged as permanently to deform the central part of the diaphragm to provide a convexly curved valve head, said head normally engaging the seat leak-tight, and means connected to one of said stiffening elements for flexing the diaphragm transversely of its axis thereby to unseat the valve head.

5. A valve device comprising a part having therein a passage which terminates in an annular valve seat, a flexible, elastic diaphragm disposed in a plane parallel to the plane of the valve seat and so located that the central part of the diaphragm is closely adjacent to the valve seat, means including a rigid clamping member operative to clamp the marginal portion of the diaphragm leak-tight against the aforesaid part, said clamping means having a central aperture, rigid stiffening elements disposed at opposite sides of the central part of the diaphragm, said stiffening elements being so constructed and arranged as to expose a portion of the diaphragm for contact with the valve seat and to constitute a valve head, the clamping means having a rigid tab disposed closely adjacent to the outer surface of the diaphragm and which has an edge parallel to a chord of the diaphragm and spaced from but adjacent to the center of the latter, said edge constituting a fixed fulcrum, and a rigid arm fixed to the outer stiffening element, the arm and stiffening element constituting a lever cooperable with the fulcrum to apply force to seat the valve head.

6. A valve device comprising a part having therein a passage which terminates in an annular valve seat, a flexible, elastic diaphragm disposed in a plane parallel to the plane of the valve seat and so located that the central part of the diaphragm is closely adjacent to the valve seat, a clamping plate operative to clamp the marginal portion of the diaphragm leak-tight to the aforesaid part, said plate having a central aperture, a stiffener element arranged at the exposed side of the diaphragm, means fixedly uniting the central part of the diaphragm to said stiffener element, the latter having a rearwardly directed boss which, by engagement with the diaphragm, causes a portion of the latter to protrude and form a convexly curved valve head, the valve head being normally held in leak-tight contact with the seat by the elasticity of the diaphragm, and a rigid arm fixed to said stiffening element and constituting means whereby the central part of the diaphragm may be tilted about an axis transverse to the axis of the valve seat thereby to unseat the valve head.

7. A valve device comprising a housing having an outer surface provided with a recess, a flexible, elastic diaphragm and means clamping the margin of the diaphragm against said outer surface of the housing, the walls of the recess together with the diaphragm defining a valve chamber, the housing having passages leading to and from the valve chamber, one of said passages terminating in an annular valve seat, the plane of the seat being parallel to and so close to the plane of the diaphragm that the seat is normally engaged leak-tight by the central portion of the diaphragm, the latter constituting a valve head operative to control the flow of fluid between the valve chamber and the passage which terminates at the valve seat, and means operative to flex the diaphragm transversely about a line approximating a chord of the diaphragm spaced from the axis of the latter thereby to dispose the central portion of the diaphragm in a plane inclined to the plane of its margins so as to separate its central head-forming portion from the seat.

8. A valve device comprising a housing having an outer surface provided with a recess, a flexible, elastic diaphragm and a rigid clamping plate engaging the margin of the diaphragm and holding said margin leak-tight against said outer surface of the housing, said clamping plate having a central aperture, the walls of the recess together with the diaphragm constituting a valve chamber, the housing having passages leading to and from the valve chamber, one of said passages terminating in an annular valve seat disposed in a plane parallel to that of the diaphragm, stiffening elements disposed at opposite sides of the mid-portion of the diaphragm, the outer of said stiffening elements being disposed within the aperture in the clamping plate, a rigid arm secured to said outer stiffening element by means of which the latter may be tilted about an axis transverse to the axis of the valve seat, the inner stiffening element having a central aperture which registers with the valve seat, and means so clamping said stiffening elements together as to cause the diaphragm to protrude into the opening in the inner stiffening element and thereby to form a valve head which normally engages the valve seat, and means operative to support the central part of the diaphragm against unbalanced pressure acting axially of the valve seat.

9. A valve device comprising a housing having an outer surface provided with a recess, a flexible, elastic diaphragm, a circular rigid plate engaging the margin of the diaphragm and clamping the latter leak-tight to the housing, said plate having a central aperture and a tab directed into said aperture and which is deflected from the plane of the plate, the plate also having shoulders projecting into the aperture at opposite sides of the latter, each of said shoulders having an edge which extends diametrically of the plate, the two edges being in alignment, the walls of the recess together with the diaphragm constituting a valve chamber, the housing having passages leading to and from said chamber, one of said passages terminating in an annular valve seat disposed in a plane parallel to the diaphragm, stiffening plates disposed at opposite sides of the mid-portion of the diaphragm, the outer plate being in the plane of the aperture in the clamping plate, the tab of the latter constituting an abutment to limit outward movement of the diaphragm, the inner stiffener plate having an aperture at which a portion of the diaphragm is exposed thereby to form a valve head which normally engages the valve seat, an annular shoulder coaxial with the valve seat and constituting an abutment cooperable with the inner stiffener plate to resist unbalanced pressure acting on the outer surface of the diaphragm, and a rigid arm fixed to the outer stiffener element, said arm being operative to tilt the central portion of the diaphragm about the aligned edges of the shoulders of the clamping plate thereby to unseat the valve head.

10. A valve device useful for example in association with a fluid supply tank into which air and liquid are delivered by a pump, for controlling the admission of air to the suction of the pump in accordance with the rise and fall of a float within the tank, said valve device comprising an externally screw-threaded plug-like housing designed to be screwed into an opening in the tank wall, said housing having a valve chamber at its inner end, means providing an annular valve seat within the chamber, the plug having a passage leading from its exterior and terminating at said valve seat, and having a second passage leading from its exterior into the chamber, a flexible, elastic diaphragm whose margin is secured leak-tight to the inner end of the plug and which constitutes a flexible wall for said chamber, a valve head, the diaphragm constituting the sole support for the valve head and by its elastic tension normally holding the valve head in contact with the seat, and a rigid arm fixed at one end to the diaphragm and operative to flex the diaphragm transversely of its axis, so as to tilt the valve head relatively to the seat, the opposite end of the arm being designed for rigid attachment to the float, the diaphragm and arm constituting means for supporting the float.

CHARLES G. ROPER.

REFERENCES CITED

The following references are of record in the file of this patent:

UNITED STATES PATENTS

| Number | Name | Date |
|---|---|---|
| 258,433 | Keith | May 23, 1882 |
| 362,963 | Hopper | May 17, 1887 |
| 596,861 | Durand | Jan. 4, 1898 |
| 627,561 | Williams | June 27, 1899 |
| 1,283,581 | Smith | Nov. 5, 1918 |
| 1,385,058 | Warter | July 19, 1921 |
| 1,433,129 | Fransson | Oct. 24, 1922 |
| 1,549,786 | Mohr | Aug. 18, 1925 |
| 1,844,528 | Smith | Feb. 9, 1932 |
| 1,910,707 | Mohr | May 23, 1933 |
| 2,107,564 | Dickey | Feb. 8, 1938 |
| 2,121,549 | McNeal | June 21, 1938 |
| 2,186,833 | Iler | Jan. 9, 1940 |
| 2,348,110 | Crowley | May 2, 1944 |

FOREIGN PATENTS

| Number | Country | Date |
|---|---|---|
| 753 | Germany | 1877 |
| 377,123 | Italy | Dec. 12, 1939 |